United States Patent [19]

Cole et al.

[11] 3,926,658

[45] Dec. 16, 1975

[54] COATING COMPOSITION

[75] Inventors: Susan Margaret Cole; David Robert Mason; Roger Norman Rothon, all of Runcorn, England

[73] Assignee: Imperial Chemical Industries Limited, London, England

[22] Filed: June 12, 1973

[21] Appl. No.: 369,200

[30] Foreign Application Priority Data

June 22, 1972 United Kingdom............... 29335/72

[52] U.S. Cl. ............... 106/287; 428/429; 260/429.5
[51] Int. Cl.[2] .................... C09K 11/30; C09K 11/20
[58] Field of Search........ 106/286, 287; 148/6.15 R, 148/6.15 Z; 117/124 T, 124 B; 260/429.5

[56] References Cited

UNITED STATES PATENTS

| 2,905,661 | 9/1959 | Muehlbauer | 260/94.9 B |
| 2,980,561 | 4/1961 | Ford et al. | 148/6.15 R |
| 3,738,863 | 6/1973 | Sugaike | 117/124 T |
| 3,813,302 | 5/1974 | Morrison | 148/6.15 R |
| 3,821,014 | 6/1974 | Haskel | 428/502 |

*Primary Examiner*—Theodore Morris
*Attorney, Agent, or Firm*—Cushman, Darby & Cushman

[57] ABSTRACT

A liquid composition containing aluminium and titanium (20:1 to 1:20 weight ratio) optionally with phosphate, which forms hard, clear, ultraviolet absorbing coatings on heating to 100°–600°C.

8 Claims, No Drawings

COATING COMPOSITION

This invention relates to compositions, useful as coatings or binders, containing aluminium and titanium.

Our invention provides a liquid composition containing aluminium and titanium, the ratio of aluminium to titanium being in the range 20:1 to 1:20 by weight of the metals.

Preferably the ratio of aluminium to titanium is from 1:1 to 1:10, for example substantially 1:5.

The composition is prepared by dissolving aluminium and titanium compounds in a solvent which contains little or no water. Examples of suitable metal compounds are the halides, carboxylates, alkoxides, acetylacetonates and other organic compounds. Solvent soluble complex phosphates may be used, for example aluminium halophosphate complexes, aluminium nitrate phosphate complexes and titanium phosphate complexes. Such complexes are described in our copending patents or applications as follows:

1. UK 29862/69 (Belgian Pat. No. 751941, French Pat. No. 7021496, German Application No. 2028839, Netherlands Application No. 7008594 and US Ser. No. 24299)
2. UK 48576/71 (Belgian Pat. No. 790 259, French Application No. 7236935 and US Ser. No. 296 985)
3. UK 48577/71 (Belgian Pat. No. 790 260, French Application No. 7236936 and US Ser. No. 296 983)
4. UK 34012/71 (Belgian Pat. No. 786415, French Application No. 7226011 and US Ser. No. 272458)

It is preferred that the compositions also contain phosphate ions which may be derived from the metal compounds or may be provided by the addition of phosphates or phosphoric acid. The phosphate is preferably orthophosphate but meta-, pyro- or poly-phosphate may also be used. The amount of phosphate present may vary: at least one atom of phosphorus per twenty of total metal is desirable. Preferably the ratio of aluminium to phosphorus is from 1:3 to 2:1 gram atom, especially substantially 1:1 gram atom. Thus both the aluminium and phosphorus in the composition may be supplied by the use of aluminium phosphate alcoholates described in copending patent applications referenced 1 to 3 above. In such a case the titanium may be provided by the addition of a compound such as titanium tetrachloride or a solution thereof in an alcohol. A convenient method of preparing the compositions is to dissolve an aluminium compound and a titanium compound separately in solvent and then to mix the two solutions in appropriate proportions.

A wide range of solvents may be used. They should be reasonably free from water, but need not be absolutely anhydrous. Organic solvents selected from alcohols, ethers, esters and ketones are preferred. Much preferred are aliphatic alcohols containing from 1 to 10 carbon atoms, including alkoxy alcohols such as ethoxyethanol.

The liquid compositions may be converted into solids for convenient transport and storage by drying, for example by spray drying.

The liquid composition prepared as such, or by dissolving the solid composition in a solvent is useful as a coating composition or as a binding agent for a variety of substrates. The compositions provide strongly adherent coatings on glass, polymers, ceramics and metals which assist in resisting atmospheric attack, for example corrosion or radiation degradation. They also absorb ultraviolet radiation and so may be used to filter out natural ultraviolet radiation through use as a coating on glass or plastics sheet, bottles or tubes. Fluorescent lamps and fittings may be protected in this way: the inside or outside of fluorescent tubes may be coated.

For these applications, some form of heating is usually necessary to produce a durable coating or binder. The heating process is referred to as curing because it is believed that some chemical reaction occurs. Curing temperatures from room temperature up to the limit imposed by the substrate are usable. If low temperatures are used, say 40° to 80°C, high titanium to aluminium ratios are usually needed for curing in a reasonable time. Preferably, curing temperatures from 100° to 600°C, for example 200° to 500°C are used. At these temperatures curing times from a few seconds to about an hour may be needed. Hot shaped glass or metal may be coated soon after shaping by spraying a liquid composition onto the hot surface, when curing is very rapid. Cooler materials may be spray, dip, roller or brush coated, the surplus solvent removed by evaporation and then the coated article is heated as required.

The invention is illustrated by the following Examples:

EXAMPLE 1

Anhydrous aluminium chloride (38.93 g) was dissolved in methanol (1850 g). The solution was poured into titanium tetrachloride (79.24 g). Orthophosphoric acid (88% 32.52 g) was added to the resultant solution. Ratio of Al:Ti (weight) 1:2.53.

A glass tube was filled with the above solution, drained rapidly and left to dry for five minutes before purging with $N_2$ for thirty minutes. The tube was fired at 200°C for an hour under a nitrogen purge of 1000 cc/min. The coating was completely clear. It reduced ultraviolet light transmittance from 50% to 8% at 325 m.

EXAMPLE 2

A liquid aluminium titanium phosphate coating composition was prepared by dissolving anhydrous aluminium chloride (1.946 g) in methanol (992 g) and pouring the solution into titanium tetrachloride (3.961 g). Orthophosphoric acid (1.626 g) was added to the resultant solution. Ratio Al:Ti (weight) 1:2.86.

A glass tube was coated internally with this composition and the coated tube thoroughly drained. It was heated at 100°C in vacuo for one hour, and then at 400°C for 3 minutes.

EXAMPLE 3 and 4

A series of tubes were prepared as described in Example 2 but using the coating formulations set out below. The coated tubes were baked at 100°C in vacuo for one hour and subsequently at 200°–600°C for three minutes.

The coating compositions were prepared from the following components in a similar manner to that described in Example 2:

| Example | 3 | 4 |
|---|---|---|
| Anhydrous aluminium chloride(g) | 0.7785 | 0.7785 |
| Methanol(g) | 398 | 395 |
| Titanium tetrachloride(g) | 0.7921 | 3.169 |
| Orthophosphoric acid 88%(g) | 0.6503 | 0.6503 |
| Content of aluminium phosphate complex with four methanol ligands (% calc) | 0.42 | 0.42 |

| Example | 3 | 4 |
|---|---|---|
| Content of titanium (% calc) | 0.05 | 0.20 |
| Ratio of Al:Ti (weight) | 1:8.4 | 1:2.1 |

With a final bake of 400°C all three formulations gave tubes with a hard, coherent coating. Variation of the baking temperature had least effect in the case of Example 4 and good coatings were obtained over the range 300°–500°C.

EXAMPLE 5

A 1% by weight aluminium solution was prepared by dissolving anhydrous aluminium trichloride (9.877 g) in methanol (190.123 g). A 5% titanium solution was prepared by dissolving titanium tetrachloride (39.61 g) in methanol (160.39 g). A coating composition was prepared by adding titanium tetrachloride in methanol (40 g of the 5% titanium solution) to the aluminium trichloride in methanol (10 g of the 1% aluminium solution), the solution was made up to 50 g with methanol. Ratio of Al:Ti=1:20. Glass slides were coated on both sides with the above formulation in an atmosphere of relative humidity less than 10%. The slides were withdrawn from the coating solution at a rate of 9 inches/min. The coating was cured at 200°C for 30 minutes. The ultraviolet absorbance of the coating so produced was measured using a Unicam SP 800 ultraviolet spectrophotometer. An uncoated slide was used as a reference blank.

| Wave length (millimicrons) | UV (absorbance) |
|---|---|
| 295 | 0.80 |
| 300 | 1.14 |
| 305 | 1.16 |
| 310 | 1.00 |
| 315 | 0.78 |
| 320 | 0.58 |
| 325 | 0.38 |

EXAMPLES 6–9

A series of slides were prepared as described in Example 5 but using the coating formulations set out below. The coated slides were cured at 200°C for 30 minutes. The coating compositions were prepared from the following components in a manner similar to that described in Example 5.

| Example | 6 | 7 | 8 | 9 |
|---|---|---|---|---|
| Anhydrous aluminium trichloride in methanol (1% aluminium) (g) | 10 | 10 | 10 | 10 |
| Methanol(g) | 60 | 70 | 80 | 85 |
| Titanium tetrachloride in methanol (5% titanium)(g) | 30 | 20 | 10 | 5 |
| Content of Aluminium (% calc) | 0.1 | 0.1 | 0.1 | 0.1 |
| Content of Titanium (% calc) | 1.5 | 1.0 | 0.5 | 0.25 |
| Ratio Al:Ti | 1:15 | 1:10 | 1:5 | 1:2.5 |

The ultraviolet absorbance of the coatings so produced was measured using a Unicam SP 800 ultraviolet spectrophotometer. An uncoated slide was used as a reference blank.

| Wavelength (millimicrons) | Absorbance | | | |
|---|---|---|---|---|
| 295 | .60 | 0.42 | 0.22 | 0.10 |
| 300 | .68 | 0.47 | 0.23 | 0.09 |
| 305 | .58 | 0.41 | 0.20 | 0.08 |
| 310 | .44 | 0.34 | 0.16 | 0.07 |
| 315 | .30 | 0.27 | 0.12 | 0.05 |
| 320 | .20 | 0.20 | 0.09 | 0.04 |
| 325 | .12 | 0.14 | 0.06 | 0.03 |

EXAMPLE 10

A 1% aluminium solution was prepared by dissolving anhydrous aluminium trichloride (9.877 g) in methoxyethanol (190.123 g). A 5% titanium solution was prepared by dissolving titanium tetrachloride (39.61 g) in methoxyethanol (160.39 g). A liquid aluminium titanium chloride coating composition was prepared by mixing the solutions: 40 g of the 5% titanium solution and 10 g of the 1% aluminium solution. The mixed solution was made up to weight with methoxyethanol (50 g). Glass slides were coated on both sides with the above composition in an atmosphere of relatively humidity less than 10%. The slides were withdrawn from the coating solution at a rate of 9 inches/min. The coating was cured at 200°C for 30 minutes. The ultraviolet absorbance of the coating so produced was measured. Ratio Al:Ti (weight) 1:20.

| Wavelength (millimicrons) | UV (absorbance) |
|---|---|
| 295 | 0.70 |
| 300 | 0.86 |
| 305 | 0.76 |
| 310 | 0.58 |
| 315 | 0.38 |
| 320 | 0.23 |
| 325 | 0.12 |

EXAMPLES 11–14

A series of slides were prepared as described in Example 10 but using the coating formulations set out below. The coated slides were cured at 200°C for 30 minutes.

| Example 7 | 11 | 12 | 13 | 14 |
|---|---|---|---|---|
| Aluminium trichloride in methoxyethanol (1% aluminium) (g) | 10 | 10 | 10 | 10 |
| Methoxyethanol(g) | 60 | 70 | 80 | 85 |

-continued

| Example 7 | 11 | 12 | 13 | 14 |
|---|---|---|---|---|
| Titanium tetrachloride in methoxyethanol (5% titanium)(g) | 30 | 20 | 10 | 5 |
| Content of Aluminium (% calc) | 0.1 | 0.1 | 0.1 | 0.1 |
| Content of Titanium (% calc) | 1.5 | 1.0 | 0.5 | 0.25 |
| Ratio Al:Ti | 1:15 | 1:10 | 1:5 | 1:2.5 |

The ultraviolet absorbance of the coatings so produced was measured.

| Wavelength (millimicrons) | Absorbance | | | |
|---|---|---|---|---|
| | Ex 11 | Ex 12 | Ex 13 | Ex 14 |
| 295 | 0.62 | 0.40 | 0.30 | 0.10 |
| 300 | 0.70 | 0.40 | 0.32 | 0.11 |
| 305 | 0.57 | 0.32 | 0.26 | 0.09 |
| 310 | 0.40 | 0.23 | 0.20 | 0.07 |
| 315 | 0.24 | 0.15 | 0.14 | 0.05 |
| 320 | 0.13 | 0.10 | 0.10 | 0.03 |
| 325 | 0.07 | 0.07 | 0.07 | 0.02k |

What we claim is:

1. A liquid composition comprising a mixture of an ionic aluminum compound and an ionic titanium compound dissolved in a solvent for said compounds, the ratio of aluminum:titanium in the composition being in the range 20:1 to 1:20 parts by weight of the metals and in the composition there being present phosphate ions to the extent of at least one atom of phosphorus per 20 atoms of metal.

2. A composition according to claim 1 in which the ratio of aluminium to titanium is 1:1 to 1:10.

3. A composition according to claim 1 in which the ratio is substantially 1:5.

4. A composition according to claim 1 in which the phosphate ions comprise ortho-phosphate.

5. A composition according to claim 1 in which the atomic ratio of aluminium to phosphorus is from 1:3 to 2:1.

6. A composition according to claim 1 in which the solvent is an aliphatic alcohol containing from 1 to 10 carbon atoms.

7. A solid composition prepared by drying a composition as claimed in claim 1.

8. A method of making a composition according to claim 1 in which an aluminium compound and a titanium compound are separately dissolved in solvents and the two solutions are then mixed.

* * * * *